J. S. BLOODWORTH.
BAGGAGE CHECK.
APPLICATION FILED DEC. 17, 1917

1,367,531.  Patented Feb. 8, 1921.

UNITED STATES PATENT OFFICE.

JAMES SEATON BLOODWORTH, OF MACON, GEORGIA.

BAGGAGE-CHECK.

1,367,531. Specification of Letters Patent. Patented Feb. 8, 1921.

Application filed December 17, 1917. Serial No. 207,527.

*To all whom it may concern:*

Be it known that I, JAMES S. BLOODWORTH, a citizen of the United States, residing at Macon, Bibb county, and State of Georgia, have invented and discovered certain new and useful Improvements in Baggage-Checks, of which the following is a specification.

My said invention relates to checks for baggage, and consists in the combinations and arrangements of elements hereinafter described and particularly set forth in the accompanying claims.

The invention has for its purpose to provide a form of baggage check particularly adapted for use on railroads, or other common carriers, whereby trunks or other baggage shipped will be more certain of reaching its intended destination than is accomplished by the type of baggage checks and manner of using the same as now practised.

The invention has for its further purpose to provide a type of baggage check having a detachable part with matter identifying the baggage attaching portion of the check and the owner's duplicate, and adapted to have indicia entered thereon giving such particulars as would be required to have for the purpose of ascertaining offhand all essential facts regarding the baggage checked in the event of mis-applying the check to a piece of baggage, or when such baggage has been sent to the wrong destination.

The invention is shown in different forms and by way of illustration in the accompanying drawing wherein, Figure 1 shows a portion of the form of improved check, Fig. 1ª is the remaining portion thereof and in use is attached to the part shown in Fig. 1, and Fig. 2 is a form of check used for local and other baggage transactions.

Referring to the construction in further detail, the check shown in Figs. 1 and 1ª consists of a part or section 3 adapted to be marked with the name of the carrier at 4 and having spaces 5 and 6 for entering the names of the places from which the baggage came and its destination. Suitably lined spaces 7 and 8 are immediately below the space 6 and have columns for entering the names of the different carriers who may carry the piece of baggage and for entering the names of such places as transfers of the piece may have occurred. The space 9 below the columns 7 and 8 is for entering information concerning weights, valuation, rates, etc., as now used by the individual carrier. A space 10 is provided for the number of the check after the usual manner.

A section 11 connects with the part 1 along a scored or perforated line 12 whereby the parts 3 and 11 may be readily separated as with ordinary baggage checks. The check portion 11 is in like manner provided with a space 13 for entering the name of the carrier and a space 14 for inserting the name of the point of destination. The ruled columns 15 and 16 serve for the same purpose as the columns 7 and 8, and the number in the space 17 is of course the same as that in the space 10 of the strap check portion. The part 11 of the check is the agent's record exchange check and serves as the agent's record for comparing and "checking up" the agent's collected checks to ascertain if all pieces of baggage have been checked to their proper destinations and thereby to correct any errors that may have occurred. The prevailing conditions under which such errors occur, and the proposed manner of avoiding the same will be further set forth in the following.

The check portion 18 is in practice attached to the section 11 along the scored line 19 thereof for ready detachment. And this part of the check is printed to correspond with the check portion 3, to wit, the name of the carrier, from where sent, point of destination, and for entering other essential data pertaining thereto. A space 20 is provided to receive the matter corresponding to that shown in the space 9 of the part 3, and the check number is entered in the space 21. The check portion 18 is to be retained by the passenger whose baggage is checked.

The bottom section 22 is connected to the part 18 along the scored line 23 and is in like manner marked with the name of the carrier, point of shipment, destination, and with ruled columns for entering the data pertaining thereto. The space 24 serves for entering the matter corresponding with spaces 9 and 20 of the parts 3 and 18, and the number of the check is shown at 25. This part of the check constitutes the agent's stub which is retained by him as a record piece for verifying cash collections that have been made, and reporting to accounting department at close of each month. This stub is inclosed with report.

In the construction shown in Fig. 2 the check comprises three sections only, to wit, the parts 26, 27, and 28, and these parts serve as the check for attaching to the piece of baggage, the agent's record exchange check, and the claim check for the passenger. The several parts 26, 27, and 28 have each a proper margin or space to receive the name of the carrier as at 29, and the lower margins 30 on the several parts all bear the one check number. The space on each part between the portions 29 and 30, to wit, the parts 31, are ruled and otherwise provided to have marked therein all data pertaining to the route over which the piece of baggage travels and the names of all carriers handling the same.

The additional coupon, or agent's record exchange check, contains the number of the check, name of issuing carrier, destination, and routing; and this coupon filed by the checking agent together with duplicate surrendered by passenger and strap check lifted from baggage gives him a clear and unmistakable record of each exchange transaction that has taken place.

The agent's record exchange check will successfully take the place of all baggage checks used, but will be most effectively used in exchange check transactions, i. e. where passengers surrender their duplicate checks, issued at an initial point, by another carrier, hotel, or transfer company, in exchange for another check reading to some other destination. On account of the number of checks exchanged daily by all railroads, there are frequent cases of mis-matching checks and baggage. When checks are mis-matched, the baggage of one person is sent to the destination of the other, and vice versa. The destination of one party may be on the Pacific coast and the destination of the other on the Atlantic coast. Under the present system and form of baggage checks used the error cannot be corrected until both pieces of baggage have been forwarded, reach their respective destinations, are there disclaimed by passengers and so reported to the checking agents at the point of origin. This may happen even though both pieces of baggage may be on hand in the baggage room at the time the error is discovered. If one piece of baggage is on hand and the other has been forwarded, there is no possible way of knowing the number of check under which the other piece of baggage has gone forward or to what destination in order that the piece on hand may be sent there and the other one returned; or if both pieces have gone forward, there is no record to show the number of check under which either piece sent forward or where to, in order that both pieces may be stopped *enroute* and ordered to the proper destinations. As above stated, nothing can be done until both pieces have reached the destinations to which sent and there disclaimed on presentation of claim checks and the matter reported to the checking agent at the points of their respective origins. Should one of the pieces of baggage be lost, there is no possible way to ascertain the correct destination of the piece reaching the destination of check and disclaimed, as this can only be done after both pieces are disclaimed and reported to the checking agents. In such instances, a claim is usually filed by each party instead of by the only one whose baggage was lost, as the case should be. On the other hand, should one of the parties accept baggage received in lieu of his own, the same being of more value, the result would be the same as in a case where one was lost, and there would be no possible way to recover the baggage or bring the guilty person to justice. As above stated, there is no trace whatever or record of the number of check with which mismatched, unless both parties disclaim baggage received under checks held by them.

Passengers experience considerable embarrassment and inconvenience when their baggage is mis-matched, and are usually put to unnecessary expense while awaiting delivery of their baggage. This would be true when baggage containing samples of traveling salesmen are mis-matched, and obviously even this reacts on the carrier. Heavy claims are invariably filed in these cases, and may usually be collected.

The unreasonable delay in locating mismatched baggage and having the same restored to its proper owner is due entirely to the present inadequate record kept by the baggage agent in exchange check transactions, and the difficulty in question cannot be improved upon while the present form of baggage checks are used in exchange check transactions.

The agent's record exchange check herein disclosed will not prevent the mis-matching of baggage by careless employees, but the additional coupon marked, "Agent's record exchange check," which is detached from check issued and placed on string with strap check lifted and duplicate surrendered by passenger, should serve as a reminder to an employee to compare duplicate and strap check while they are both in his possession, and are calculated to prevent a number of mis-matched transactions. The agent's record exchange check, while not preventing mis-matched checks, will greatly aid in reducing the delay in correcting the error to a great extent. When a passenger presents a baggage or claim check for re-checking baggage to a given point that has arrived there under a baggage or claim check that has been issued by same or another carrier, hotel or transfer company, the baggage agent detaches the bottom coupon marked "Duplicate check," and delivers it to the passenger in lieu of the duplicate surrendered by him. Baggage agent also detaches any other coupon that should be retained by him, as in case of excess weight or excess valuation transactions, he then takes balance of check, consisting of strap check and agent's record exchange check, intact, to baggage, lifts strap check corresponding with duplicate surrendered by passenger, puts strap check corresponding with duplicate issued to passenger on baggage and detaches therefrom coupon marked "Agent's record exchange check," and puts on string of strap check lifted together with duplicate portion surrendered by passenger. In case checks are mis-matched, the coupon indorsed Agent's record exchange check showing destination, number of check under which baggage was forwarded and routing, strung with the strap portion of one check and the duplicate portion of the other check, and being mis-matched, gives baggage agent a complete record of every transaction, and enables him to know which pieces are mis-matched, where they came from and where they have been forwarded, should they not be on hand when the error is discovered. Baggage can be ordered to correct destination whether *enroute* or at destination of checks. This cannot be done with the present form of checks used.

It is the usual custom of baggage agents to compare duplicate and strap portion of checks collected at least once daily and file them away in date order; therefore the majority of mis-matched transactions are discovered in a short time after the error is committed. By the use of the agent's record exchange check, if the error is detected before departure of baggage, the error can immediately be corrected without the slightest delay to either piece of baggage. Should one piece be on hand and the other piece forwarded, the one on hand can be sent to proper destination and the one forwarded stopped *enroute* and sent to the correct destination; and should both pieces of baggage be forwarded, they can be reached in transit or at destination and be returned or sent direct to proper destination with a minimum delay. If one piece reaches destination and is disclaimed before error is discovered, it is not necessary to wait for the other to reach its destination to know where the piece that has reached its destination is wanted, and this is also true with the piece still in transit. Should one piece become lost, the correct destination of the other is not dependent upon finding this piece; therefore, claim for only one piece of baggage would be incurred, which would be the one lost. Should one of the parties accept baggage received in lieu of his own, same being of more value, the result would be the same as in a case where the one was lost, except that forwarding agent would have number of check, destination and routing, and baggage could be recovered and the guilty party brought to justice. Should the baggage be re-checked, it could be traced from point to point, and should the same be delivered by a transfer company, there would be a record of the street address to which it was delivered.

Another valuable asset to this check is in case of concealed loss or damage to baggage traveling from one point to another via one railroad and re-checked at destination to another point reached by another carrier without taking same from baggage room at point re-checked. Damage or loss being of a concealed nature, it is not detected by baggage agent at first destination where re-checked and no exceptions are made against the first carrier on whose line the damages occurred. If a claim be filed against the delivering carrier for the damages, the absence of a complete record of the transaction at point where re-checked and the inability to show number of check under which this baggage was received at first destination and point of origin, the carrier first handling the baggage cannot be connected with the responsibility for the damages and the delivering line would be required to make full settlement of the claim. By use of the agent's record exchange check, this fault can be eliminated entirely, as explained above. The aditional check gives agent at the point re-checked a complete record of the entire transaction and when called upon by the delivering line such agent can furnish *bona fide* evidence as to number of check under which the baggage was received at his station, point of origin and lines over which it traveled, also number of the check under which forwarded, destination and name of lines over which traveled, thereby enabling the delivering carrier to have any other line, or lines, handling the baggage participate in settlement of the claim. This cannot be done under the present system of handling and form of checks used.

It is obvious that those skilled in the art may vary the details of construction and arrangement of parts without departing from the spirit of my invention, and therefore I do not wish to be limited to such features except as may be required by the claim.

Having thus described my invention, what I claim as new and desire to secure by Letters Patent is:

1. A baggage-checking device comprising a strip separated by tear lines into a plurality of separable sections each displaying the name of the initial carrier, corresponding numbers and also spaces properly designated to receive the name of destination and routing including intervening carriers and points of interchange, one of said sections being properly designated for delivery to the consignor, one of said sections being properly designated to be attached to and accompany the baggage and a section properly designated to remain attached to and accompany the last mentioned section and to be detached and retained by the carrier organization at a point of interchange.

2. A baggage-checking device comprising a strip separated by tear lines into a plurality of separable sections each displaying the name of the initial carrier, corresponding numbers and also spaces properly designated to receive the name of destination and routing including intervening carriers and points of interchange, one of said sections being properly designated for delivery to the consignor, one of said sections being properly designated to be attached to and accompany the baggage, a section properly designated to remain attached to and accompany the last mentioned section to be detached and retained by the carrier organization at a point of interchange and a section properly designated to be retained at the point of despatch.

In witness whereof, I have hereunto set my hand and seal at Macon, Georgia, this 24th day of October, A. D. nineteen hundred and seventeen.

JAMES SEATON BLOODWORTH. [L. S.]

Witnesses:
A. CULLEN FREEMAN,
E. O. SMITH.